(12) United States Patent
Serra et al.

(10) Patent No.: US 7,484,544 B2
(45) Date of Patent: Feb. 3, 2009

(54) SELF-SEALING TIRE FOR A VEHICLE WHEEL AND PROCESS FOR PRODUCING THE TIRE

(75) Inventors: Antonio Serra, Genoa (IT); Marco Nahmias Nanni, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 295 days.

(21) Appl. No.: 10/516,172

(22) PCT Filed: May 31, 2002

(86) PCT No.: PCT/EP02/05973

§ 371 (c)(1), (2), (4) Date: Jul. 15, 2005

(87) PCT Pub. No.: WO03/101709

PCT Pub. Date: Dec. 11, 2003

(65) Prior Publication Data

US 2006/0005909 A1    Jan. 12, 2006

(51) Int. Cl.
*B60C 5/00* (2006.01)
*B60C 5/14* (2006.01)
*B29D 30/00* (2006.01)
*B29D 30/06* (2006.01)

(52) U.S. Cl. ............... 152/502; 152/503; 152/504; 156/110.1; 156/115

(58) Field of Classification Search ............ 152/502, 152/503, 504, 505, 506, 507; 156/115
See application file for complete search history.

(56) References Cited

U.S. PATENT DOCUMENTS

| 3,903,947 A | 9/1975 | Emerson |
| 3,981,342 A | 9/1976 | Farber et al. |
| 4,064,922 A * | 12/1977 | Farber et al. .......... 152/504 |
| 4,424,295 A * | 1/1984 | Van Ornum et al. .... 524/526 |
| 4,768,937 A | 9/1988 | Singh |
| 4,872,822 A | 10/1989 | Pizzorno |
| 4,895,610 A | 1/1990 | Egan |
| 4,895,692 A | 1/1990 | Laurent et al. |
| 4,913,209 A | 4/1990 | Hong et al. |

(Continued)

FOREIGN PATENT DOCUMENTS

EP    0 102 844    3/1984

(Continued)

*Primary Examiner*—Justin Fischer
(74) *Attorney, Agent, or Firm*—Finnegan, Henderson, Farabow, Garrett & Dunner, L.L.P.

(57) ABSTRACT

A tire for a vehicle wheel includes a carcass structure, a belt structure, a tread, a pair of sidewalls, and at least one layer of sealing composition placed in a radially inner position with respect to the tread. The carcass structure includes at least one carcass ply shaped in a substantially toroidal configuration. Opposite lateral edges of the carcass structure are associated with respective bead wires. The belt structure includes at least one belt strip. The sealing composition includes at least one high molecular weight amorphous polymer, at least one low molecular weight amorphous polymer, and at least one reinforcing filler. The sealing composition is substantially non-crosslinked and has a flowability value, measured at a temperature of 100° C. and at a pressure of 30 bar, not higher than 30 cm³/s. A process for producing the tire for a vehicle wheel is also disclosed.

61 Claims, 2 Drawing Sheets

U.S. PATENT DOCUMENTS 4,919,183 A    4/1990   Dobson

FOREIGN PATENT DOCUMENTS

| EP | 0 127 998 A2 | 12/1984 |
| --- | --- | --- |
| EP | 0 199 064 B1 | 10/1986 |
| EP | 0 242 840 B1 | 10/1987 |
| EP | 0 302 400 B1 | 4/1992 |
| EP | 0 928 680 B1 | 7/1999 |
| EP | 0 928 702 B1 | 7/1999 |
| JP | 11-302629 | 11/1999 |

* cited by examiner

SELF-SEALING TIRE FOR A VEHICLE WHEEL AND PROCESS FOR PRODUCING THE TIRE

CROSS-REFERENCE TO RELATED APPLICATIONS

This application is a national-phase entry under 35 U.S.C. § 371 from International Application No. PCT/EP02/05973, filed May 31, 2002, in the European Patent Office, the content of which is relied upon and incorporated herein by reference.

BACKGROUND OF THE INVENTION

1. Field of the Invention

The present invention relates to a self-sealing tyre for vehicle wheels.

More particularly, the present invention relates to a self-sealing tubeless tyre for vehicle wheels and to a process for manufacturing said tyre.

2. Description of the Related Art

In the industrial field of tyres for vehicle wheels, various attempts have been made to produce self-sealing tyres, in other words tyres which may retard or prevent the loss of air and consequent deflation of the tyres themselves following a puncture caused e.g. by a sharp object (a nail, for example).

To achieve the above goal, self-sealing tyres are known which are provided with at least one layer comprising a polymeric material which may adhere to the object causing the puncture and may also flow into the puncture site when said object is removed, thus sealing the puncture and preventing the outflow of air from the tyre.

For example, U.S. Pat. No. 3,981,342 describes a self-sealing tubeless tyre provided with a layer including a composition comprising a mixture of a low molecular weight liquid elastomer and a high molecular weight solid elastomer, and a quantity of a crosslinking agent sufficient to give a partial crosslinking of said mixture, said liquid elastomer being present in a greater quantity than said solid elastomer. Examples of low molecular weight liquid elastomers which may be used according to the invention are: liquid cis-polyisoprene (for example, heat-depolymerized natural rubber, or cis-polyisoprene polymerized to low molecular weight); liquid polybutadiene; liquid polybutene; liquid EPDM; liquid butyl rubber. Examples of high molecular weight elastomers which may be used according to the invention are highly unsaturated rubbers such as those based on conjugated diolefins, whether homopolymers as in polyisoprene (particularly natural or synthetic cis-polyisoprene); polybutadiene (including polybutadiene with a high cis content); polychloroprene (neoprene); or copolymers as exemplified by those having a major proportion of such conjugated dienes as butadiene with a minor proportion of such monoethylenically unsaturated copolymerizable monomers as styrene or acrylonitrile. Alternatively, it is possible to use elastomers with a low degree of unsaturation such as butyl rubbers (isoolefin copolymers, for example isobutylene, with small quantities of dienes, for example isoprene), or EPDM-type rubbers (copolymers of at least two different monoolefins such as ethylene and propylene with a small quantity of a non-conjugated diene such as dicyclopentadiene, 1,4-hexadiene, 5-ethylidene-2-norbornene). Finally, it is also possible to use saturated elastomers such as EPM or ethylene-vinyl acetate copolymers. Examples of crosslinking agents which may be used according to the invention are: sulhur or sulfur donors; quinones; organic peroxides or hydroperoxides; polyisocyanates; and tetrahydrocarbyl titanate esters. Said layer would be able to impart self-sealing properties to the tyre.

Patent application EP 127 998 describes a tubeless tyre wherein the inner liner is a laminar structure formed by two outer layers comprising a halogenated butyl rubber and an inner layer comprising a butyl rubber and an organic peroxide. The inner layer comprising butyl rubber preferably contains, per 100 part by weight of butyl rubber, from 40 to about 100 part by weight of one or more type of carbon black, from about 5 to about 40 part by weight as plasticizers of one or more fluid polyisobutylenes or copolymers containing polyisobutylene, from about 5 to about 30 parts by weight of one or more hydrocarbon oils, especially paraffinic hydrocarbon oil, from about 2 to 20 parts by weight of one or more tackifiers such as hydrocarbon or hydrogenated wood rosin tackifiers, from about 0.5 to about 3 parts by weight of other processing aids such as stearic acid and the like, and a peroxidic compound which may be selected from organic peroxides and inorganic peroxides. The amount of such organic peroxides, defined on the basis of pure material, is from about 2 to about 4 parts by weight per 100 part by weight of butyl rubber. Suitable inorganic peroxides include zinc peroxide and the amount of zinc peroxide which may be used is from about 3 to about 10 parts by weight per 100 parts by weight of butyl polymer. After vulcanization, the butyl rubber of said inner layer would be degraded, because of the presence of the peroxidic compound, thus producing a polymeric material having a Mooney viscosity ML(1+4) at 100° C. in the range from 2 to 12. Said polymeric material would be able to impart self-sealing properties to the tyre.

U.S. Pat. No. 4,895,610 describes a self-sealing tyre provided with a layer comprising a butyl rubber and at least one peroxide vulcanizing agent. Preferably, said layer comprises: 100 parts of butyl rubber; about 10 to 40 parts of carbon black; about 5 to 35 parts of polyisobutylene; about 5 to 35 parts of an oil extender; about 0 to 1 parts of sulfur; and about 1 to 8 parts of a peroxide vulcanizing agent. During the vulcanization of the tyre, the butyl rubber, in the presence of the peroxide vulcanizing agent, would be capable of being partially cross-linked thus providing dimensional stability to said layer, and also of being partially degraded thus providing a low-viscosity tacky material capable of imparting self-sealing properties to said tyre.

U.S. Pat. No. 4,913,209 describes a self-sealing tubeless pneumatic tyre constructed upon a laminate of elastomers comprising an air-impervious liner or elastomeric strip ("inner liner") coated with a thin layer of bare (that is, not covered and not constrained by a sheet of flexible material) elastomeric puncture-sealing material ("sealant"). The sealing material consists essentially of (i) a blend of a major amount by weight of high molecular weight elastomer, and a minor amount by weight of low molecular weight elastomer, based on the combined weight of the high and low molecular weight elastomers; (ii) at least as much processing aid, whether homogenizer or tackifier, as there is high molecular weight elastomer; and (iii) a curative in an amount sufficient to provide said sealant with a peak room temperature (75° F.) Mooney viscosity (MLP/rt) in the range of from above 70 to about 110 and, when cured, with a peak Mooney viscosity at 150° F. (MLP/150) below 30, preferably in the range of from above about 15 but less than 30. Examples of high molecular weight elastomers which may be used according to the invention are highly unsaturated rubbers such as, those based on conjugated diolefin, whether homopolymers as in polyisoprene (particularly natural or synthetic cis-polyisoprene); polybutadiene (including polybutadiene of high cis content); polychloroprene (neoprene); or copolymers as exemplified by those having a major proportion of such conjugated dienes such as butadiene with a minor proportion of such monoethylenically unsaturated copolymerizable monomers as styrene or acrylonitrile. Alternatively, elastomers of low unsaturation may be used, notably butyl rubbers (copolymers of such isoolefin as isobutylene with small amounts of conjugated dienes such as isoprene), or EPDM-type rubbers (copolymers of at least two different monoolefins such as ethylene and propylene with a small amount of a non-conjugated diene such as dicyclopentadiene, 1,4-hexadiene, 5-ethylidene-2-norbornene). Even saturated elastomers such as EPM or ethylene-vinyl acetate copolymers may be employed, using the proper cure system. Examples of low molecular weight elastomers which may be used according to the invention are liquid cis-polyisoprene (for example, heat-depolymerized natural rubber, or cis-polyisoprene polimerized to low molecular weight); liquid polybutadiene; liquid polybutene; liquid EPDM; liquid butyl rubber. Examples of homogenizing agents (homogenizers) which may be used in the invention are low molecular weight polymeric resin blends. Examples of tackifiers which may be used in the invention are low molecular weight material such as rosin ester; aliphatic petroleum hydrocarbon resins; polyterpene resins; resins made from styrene and related monomers; resins made from dicyclopentadiene; and resins obtained from the reaction of a mineral oil purification residue with formaldehyde and with nitric acid catalyst. Examples of crosslinking agents which may be used according to the invention are: sulfur or sulfur donors; quinones; organic peroxides or hydroperoxides; polyisocyanates; and tetrahydrocarbyl titanate esters. Said layer would be able to impart self-sealing properties to the tyre.

Nevertheless, the solutions proposed in the above-mentioned prior art show some drawbacks.

For example, in the case of degradation, the self-sealing layer has to be laminated between at least two other undergraded layers in order to be capable of retaining its structural integrity both during the vulcanization operation wherein high pressure are applied to the tyre which would displace the degraded rubber layer from its desired location if not laminated and during the use of the tyre. The problem is complicated by the extreme centrifugal force to which the sealing composition is subjected as the tyre rotates at high speed since said centrifugal force tends to cause the composition to flow into the central crown area leaving the areas near the shoulder unprotected.

In the case of crosslinking it is necessary to pay particulary attention to the degree of crosslinking of the final sealing composition. If the degree of crosslinking is too high the sealing composition does not possess a necessary flowability which allows the same to flow into the puncture hole, while if the degree of crosslinking is too low, the same drawbacks above-mentioned in the case of degraded sealing composition arise.

SUMMARY OF THE INVENTION

The Applicant has now found that it is possible to obtain a sealing composition which overcomes the above-mentioned drawbacks. In particular, Applicant has found that it is possible to obtain a composition which, even though not being subjected to the action of any degradation or crosslinking agent or treatment, is endowed with sealing properties. More in particular, Applicant has found that it is possible to obtain said sealing properties utilizing a sealing composition in which the flowability values measured before and after an heating treatment remain substantially unchanged.

In a first aspect, therefore, the present invention relates to a tyre for vehicle wheels, comprising:
 a carcass structure having at least one carcass ply shaped in a substantially toroidal configuration, whose opposite lateral edges are associated with respective bead wires;
 a belt structure comprising at least one belt strip applied in a circumferentially outer position with respect to said carcass structure;
 a tread circumferentially superimposed on said belt structure;
 a pair of sidewalls applied laterally on opposite sides with respect to said carcass structure;
 at least one layer of sealing composition placed in a radially inner position with respect to said tread;

wherein said sealing composition comprises:
 (a) at least one high molecular weight amorphous polymer;
 (b) at least one low molecular weight amorphous polymer;
 (c) at least one reinforcing filler;

is substantially non-crosslinked and has a flowability value, measured at a temperature of 100° C. and at a pressure of 30 bar, not higher than 30 cm$^3$/s.

In a further embodiment, said sealing composition also comprises at least a plasticizer (d).

In a further embodiment, the ratio between the flowability value of said sealing composition measured at a temperature of 100° C. and at a pressure of 30 bar and the flowability value of said sealing composition heated at a temperature of 200° C. for 10 min, measured at a temperature of 100° C. and at a pressure of 30 bar, is comprised between 0.7 and 1.3, preferably between 0.8 and 1.2.

In the present description and in the claims, the wording "substantially non-crosslinked" means that the sealing composition is not subjected to the action of any crosslinking agent known in the art such as, for example, sulfur or sulfur donors, quinones, organic peroxides or hydroperoxydes, polyisocyanates, tetrahydrocarbyl titanate esters. Moreover, said sealing composition is not subject to any irradiation treatment known in the art such as, for example, X-rays or γ-rays, or particle radiations (i.e. high speed electrons, protons, ect.).

In a preferred embodiment, said layer of sealing composition is placed in a radially inner position with respect to said carcass structure.

In a further preferred embodiment, said layer of sealing composition is placed between said carcass structure and a layer of elastomeric material placed in a radially inner position with respect to said carcass structure.

In a further preferred embodiment, a further layer of elastomeric material is placed between said layer of sealing composition and said carcass structure.

In a further preferred embodiment, said layer of sealing composition extends over a surface substantially corresponding to the surface of development of said tread.

In a further preferred embodiment, said layer of sealing composition has a thickness in the range of from 0.5 mm to 6.0 mm, preferably in the range of from 1.0 mm to 4.0 mm.

More preferably, said sealing composition comprises:
 (a) 100 phr of at least one high molecular weight amorphous polymer;
 (b) from 25 phr to 75 phr, preferably from 30 phr to 60 phr of at least one low molecular weight amorphous polymer;
 (c) from 50 phr to 150 phr, preferably from 55 phr to 120 phr, of at least one reinforcing filler;
 (d) from 0 phr to 100 phr, preferably from 30 phr to 70 phr, of at least one plasticizer.

In the present description and in the claims, the expression "phr" is intended to indicate the parts by weight of a given component per 100 parts by weight of the high molecular weight elastomeric polymer (a).

In a further aspect, the present invention relates to a process for producing tyres for vehicle wheels, said process comprising the following steps:

manufacturing a green tyre by assembling on a toroidal support at least one carcass ply, a belt structure in a circumferentially outer position with respect to said carcass ply, a tread in a circumferentially outer position with respect to said belt structure;

subjecting the green tyre to moulding in a mould cavity formed in a vulcanization mould;

subjecting said green tyre to crosslinking by heating to a predetermined temperature and for a predetermined period;

said process further comprising the step of providing at least a layer of sealing composition, wherein said sealing composition comprises:

(a) at least one high molecular weight amorphous polymer;
(b) at least one low molecular weight amorphous polymer;
(c) at least one reinforcing filler;

is substantially non-crosslinked and has a flowability value, measured at a temperature of 100° C. and at a pressure of 30 bar, not higher than 30 cm³/s.

According to a preferred embodiment, said step of providing at least a layer of sealing composition is carried out by applying the sealing composition onto the inner surface of the finished tyre.

According to a further embodiment, said step of providing at least a layer of sealing composition is carried out during the manufacturing of the green tyre.

In a preferred embodiment, the step of crosslinking is carried out by heating the green tyre to a temperature in the range from 100° C. to 250° C., preferably from 120° C. to 200° C.

In a preferred embodiment, the high molecular weight amorphous polymer (a) which may be used according to the present invention may be selected from amorphous polymers or copolymers containing an unsaturated chain, with a glass transition temperature generally of less than 20° C., preferably between 0° C. and −90° C. These polymers or copolymers may be of natural origin or may be obtained by solution polymerization or emulsion polymerization of one or more conjugated diolefins, optionally mixed with one or more monovinylarenes in amounts generally not greater than 50% by weight.

The conjugated diolefins generally contain from 4 to 12, preferably from 4 to 8 carbon atoms, and may be chosen from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof.

Monovinylarenes which may optionally be used as comonomers generally contain from 8 to 20, preferably from 8 to 12 carbon atoms, and may be chosen, for example, from: styrene; 1-vinylnaphthalene; 2-vinylnaphthalene; various alkyl, cycloalkyl, aryl, alkylaryl or arylalkyl derivatives of styrene, such as, for example: α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, or mixtures thereof.

Preferably, the high molecular weight amorphous polymer (a) which may be used according to the present invention may be chosen from: cis-1,4-polyisoprene (natural or synthetic, preferably natural rubber), epoxidized natural rubber (ENR), 3,4-polyisoprene, polychloroprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene copolymers, styrene/isoprene/1,3-butadiene copolymers; or mixtures thereof.

According to a further preferred embodiment, the high molecular weight amorphous polymer (a) may be selected from copolymers of ethylene with at least one ester containing an ethylenic unsaturation. According to one preferred embodiment, said copolymer is a copolymer of ethylene with at least one ester containing an ethylenic unsaturation, chosen from: alkyl acrylates, alkyl methacrylates and vinyl carboxylates, wherein the linear or branched alkyl group may contain from 1 to 8, preferably from 1 to 4 carbon atoms, while the linear or branched carboxylic group may contain from 2 to 8, preferably from 2 to 5 carbon atoms. Said ester may be present in the copolymer in an amount of between 5% and 50% by weight, preferably between 15% and 40% by weight. Examples of acrylates and methacrylates include: ethyl acrylate, methyl acrylate, methyl methacrylate, t-butyl acrylate, n-butyl acrylate, n-butyl methacrylate, 2-ethylhexyl acrylate. Examples of vinyl carboxylates include: vinyl acetate, vinyl propionate, vinyl butanoate.

Specific examples of copolymers of ethylene with at least one ester containing an ethylenic unsaturation which may be used in the present invention include: ethylene/vinyl acetate (EVA), ethylene/ethyl acrylate (EEA), ethylene/butyl acrylate (EBA) copolymers.

According to a further preferred embodiment, the high molecular weight amorphous polymer (a) may be selected from elastomeric polymers of one or more monoolefins with an olefinic comonomer or derivatives thereof. The monoolefins may be chosen from: ethylene and α-olefins generally containing from 3 to 12 carbon atoms, such as, for example, propylene, 1-butene, 1-pentene, 1-hexene, 1-octene, or mixtures thereof. The following are preferred: copolymers of ethylene and of an α-olefin, and optionally of a diene; isobutene homopolymers or copolymers thereof with smaller amounts of a diene, which are optionally at least partially halogenated. The diene which may be present generally contains from 4 to 20 carbon atoms and is preferably chosen from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Among these, the high molecular weight amorphous polymer (a) that are particularly preferred include: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

According to a preferred embodiment, the high molecular weight amorphous polymer (a) has a weight average molecular weight ($M_w$) of more than 150,000, preferably within the range of from 200,000 to 2 or 3 million or more.

Said weight average molecular weight may be determined according to conventional techniques such as, for example, by gel permeation chromatography (GPC).

According to a further preferred embodiment, the high molecular weight amorphous polymer (a), has a viscosity within the range of from 20 to 160.

Said viscosity may be either a Mooney viscosity ML(1+4) at 100° C. or a Mooney viscosity ML(1+8) at 125° C.

Preferably, the high molecular weight amorphous polymer (a) is selected from natural rubber and butyl rubbers. Butyl rubbers are produced by copolymerization of isobutene with a small quantity of isoprene. Butyl rubbers generally contain from about 1% by weight to about 5% by weight. of isoprene repeating units and from about 95% by weight to about 99% by weight of isobutene repeating units.

Examples of butyl rubbers which may be used in the present invention and are currently available on the market are the Bayer Butyl® products made by Bayer.

According to a preferred embodiment, the low molecular weight amorphous polymer (b) which may be used in the present invention, has a weight average molecular weight ($M_w$) less than 150,000, preferably within the range of from 500 to 100,000.

Said weight average molecular weight may be determined according to conventional techniques such as, for example, by gel permeation chromatography (GPC).

According to a further preferred embodiment, the low molecular weight amorphous polymer (b) is selected from liquid rubbers having a viscosity not higher than 2 million cPs, more preferably within the range of from 100 cPs to 1 million cPs.

Said viscosity may be either a Brookfield viscosity at 38° C. or a kinematic viscosity at 100° C.

Specific examples of low molecular weight amorphous polymers (b) which may be used in the present invention include: liquid cis-polyisoprene (such as heat depolymerized natural rubber or synthetic cis-polyisoprene polymerized to low molecular weight), liquid polybutadiene, liquid polybutene, liquid ethylene/propylene/diene copolymers (EPDM), liquid butyl rubber. Heat depolymerized natural rubber and liquid polybutene are particularly preferred.

In a preferred embodiment, the reinforcing filler (c) may be selected from carbon black, silica, alumina, aluminosilicates, calcium carbonate, kaolin, or mixtures thereof. Carbon black is preferred.

The types of carbon black which may be used according to the present invention may be selected from those conventionally used in the production of tyres which generally have a surface area of not less than 20 $m^2/g$ (determined by absorption of CTAB as described in the ISO 6810 standard).

As a source of carbon black, the crumb rubber derived from waste tyre, in particular from tyre tread, may be used.

The silica which may be used according to the present invention may generally be a pyrogenic silica or, preferably, a precipitated silica, having a surface area BET (measured according to the ISO 5794/1 standard) in the range from 50 $m^2/g$ to 500 $m^2/g$, preferably from 70 $m^2/g$ to 200 $m^2/g$.

In a preferred embodiment, the plasticizer (d) may be selected from: mineral oils, vegetable oils, synthetic oils, or mixtures thereof such as, for example, aromatic oil, naphthenic oil, phthalates, soya oil, or mixtures thereof. An aromatic oil is preferred.

The sealing composition according to the present invention may optionally comprise other additives commonly used in elastomeric compositions. For example, antioxidants, anti-ageing agents, adhesives, anti-ozone agents, modifying resins, coupling agents for silica (such as, for example, silanes), or mixtures thereof may be added to said sealing composition.

As disclosed above, the layer of sealing composition is carried out by applying the sealing composition onto the inner surface of the finished tyre.

In order to apply the sealing composition onto the inner surface of the finished tyre the sealing composition may be prepared as a solution, for example, as a solution in n-hexane or other suitable volatile organic solvent. This solution may be applied, for example, by spraying or brushing, over the desired area of the inner surface of the finished tyre, using as many coats as required to build up a desired thickness.

Another method is to extrude the sealing composition onto the inner surface of the finished tyre at elevated temperature in the form of a layer having the desired thickness. Conveniently, the sealing composition may be extruded directly onto the tyre carcass surface from a suitable shaped die extending onto the tyre carcass, while rotating the tyre.

Alternatively, a previously prepared strip such as, for example, an extruded strip of sealing composition of suitable width and thickness may be applied by any suitable means to the inner surface of the finished tyre.

As disclosed above, the layer of sealing composition is carried out during the manufacturing of the green tyre.

In this case, the application may be carried out, for example, by laying down a layer of sealing composition on a toroidal support and then superimposing a layer of elastomeric material, generally called "liner" which provide the necessary impermeability to the inflation air of the tyre and other carcass components. The layer of sealing composition may be prevented from adhering to the toroidal support by first placing a layer of flexible material on the toroidal support followed by the layer of sealing composition and then the remaining component of the tyre. Thus, a layer of elastomeric material may first be placed on the toroidal support, followed by the layer of sealing composition and carcass plies. Alternatively a "liner" may first be placed on the toroidal support, followed by a layer of a sealing composition and carcass plies. Alternatively, a "liner" may first be placed on the toroidal support, followed by a layer of a sealing composition, a further layer of elastomeric material, generally called "under-liner" which may also be provided as an additional means for ensuring the impermeability of the tyre, and carcass plies.

The sealing composition according to the present invention may be prepared by mixing the components indicated above with the other additives which may be present, according to methods known in the art. The mixing may be carried out, for example, by means of a mixer of the open-mill type, or an internal mixer of the type with tangential rotors (Banbury) or interlocking rotors (Intermix), or in continuous mixers of the Ko-Kneader (Buss) type or the twin-screw co-rotating or counter-rotating type.

Preferably, the preparation of the sealing composition according the present invention is carried out in a continuous mixer, for instance a twin-screw extruder, at a temperature of more than 120° C., so as to obtain a good homogenization of the components.

BRIEF DESCRIPTION OF THE DRAWINGS

The present invention will now be illustrated further by some examples, with reference to the attached FIG. 1 and FIG. 2, which show a sectional view of a portion of the tyre made according to the invention.

DETAILED DESCRIPTION OF THE EXEMPLARY EMBODIMENTS

Figure 1:
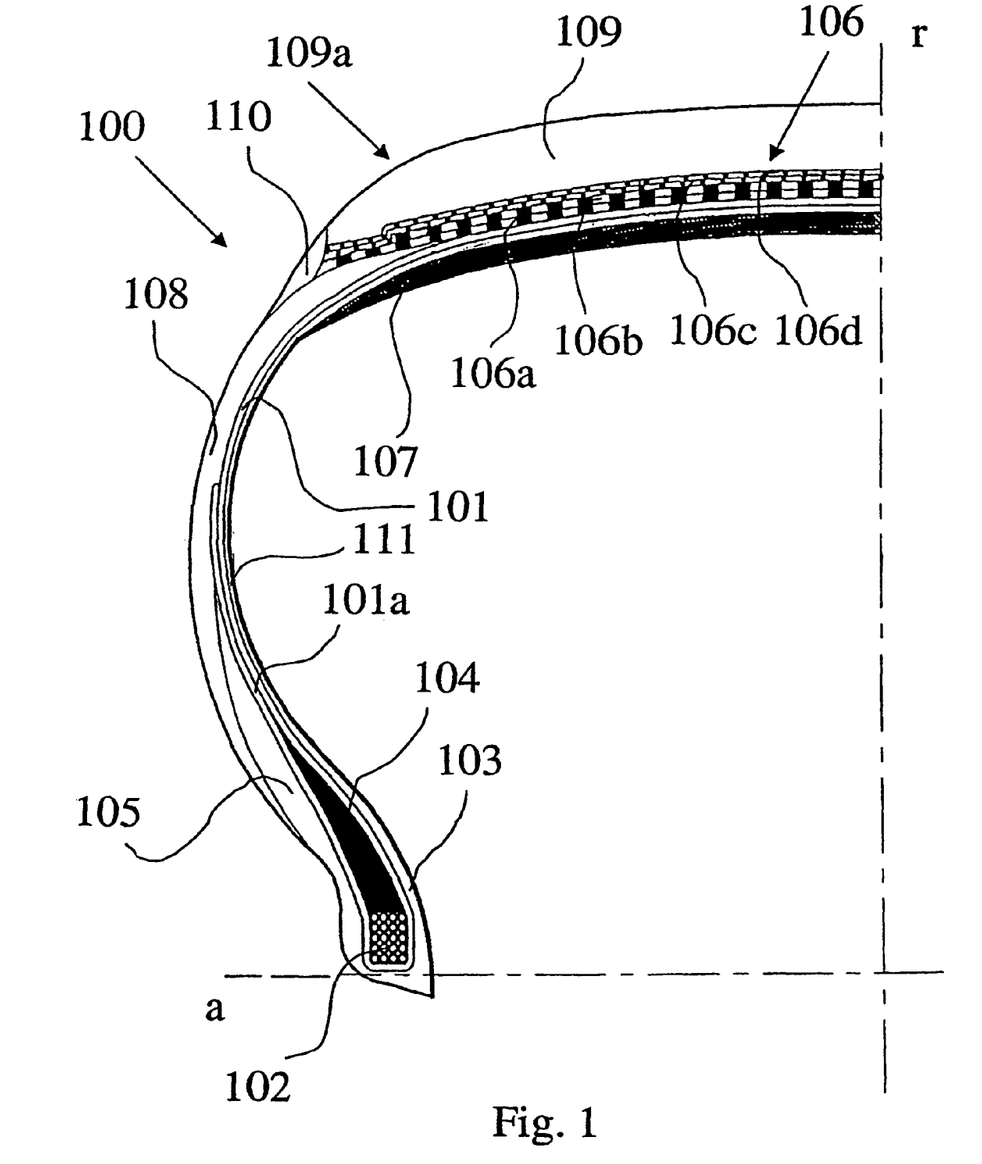
Figure 2:
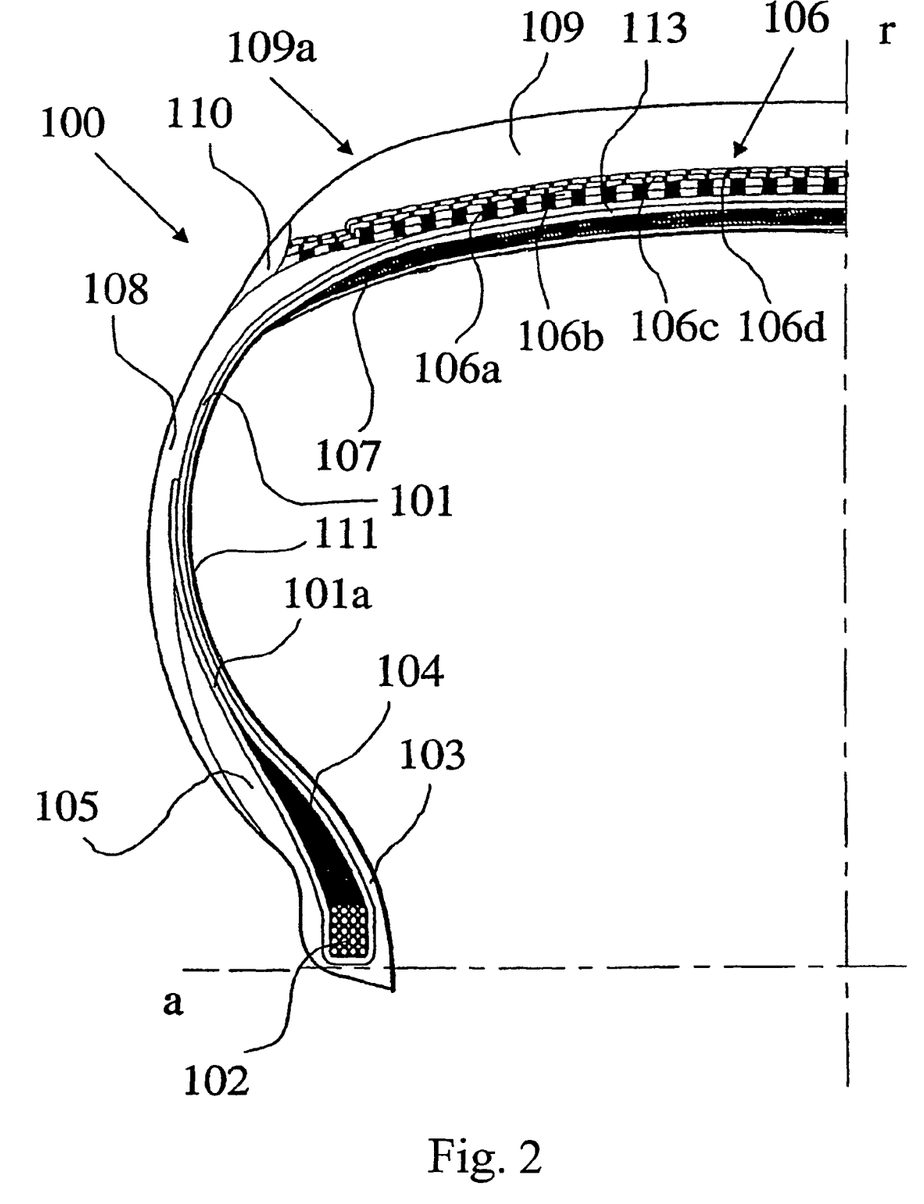

The letter "a" indicates an axial direction, and "r" indicates a radial direction. For simplicity, FIG. 1 and FIG. 2 show only a portion of the tyre, the remaining portion, which is not shown, is identical and symmetrically arranged with respect to the radial direction "r".

The tyre (100) comprises at least one carcass ply (101) whose opposite lateral edges are associated with respective bead wires (102). The association between the carcass ply (101) and the bead wires (102), in this case, is achieved by folding back the opposite lateral edges of the carcass ply (101) around the bead wires (102), so as to form the so-called carcass back-folds (101a) as shown in FIG. 1 and FIG. 2.

Alternatively, the conventional bead wires (102) may be replaced by a pair of circumferentially inextensible annular inserts formed by elongate elements arranged in concentric coils (not shown in FIG. 1 and FIG. 2) (see, for example, European patent applications EP 928,680 and EP 928,702). In this case, the carcass ply (101) is not back-folded around said annular inserts, the coupling being provided by a second carcass ply (not shown in FIG. 1 and FIG. 2) applied externally onto the first ply.

The carcass ply (101) generally consists of a plurality of reinforcing cords arranged parallel to each other and at least partially covered with a layer of elastomeric mixture. These reinforcing cords usually consist of textile fibres such as, for example, rayon, nylon, polyethylene terephthalate, or of steel wires which are stranded together, covered with a metal alloy (for example copper/zinc, zinc/manganese, zinc/molybdenum/cobalt alloys and the like).

The carcass ply (101) is usually of the radial type; in other words, it incorporates reinforcing cords arranged in a substantially perpendicular direction with respect to a circumferential direction. Each bead wire (102) is encased in a bead (103), defined along an inner circumferential edge of the tyre (100), with which the tyre engages on a rim (not shown in FIG. 1 and FIG. 2) forming part of a vehicle wheel. The space defined by each carcass back-fold (101a) contains a bead filler (104) wherein the bead wires (102) are embedded. An anti-abrasion strip (105) is usually placed in an axially outer position with respect to the carcass back-fold (101a).

A belt structure (106) is applied along the circumferential development of the carcass ply (101). In the particular embodiment shown in FIG. 1 and FIG. 2, the belt structure (106) comprises two belt strips (106a, 106b) which incorporate a plurality of reinforcing cords, typically metal cords, which are parallel to each other in each strip and intersecting with respect to the adjacent strip, orientated so as to form a predetermined angle with respect to a circumferential direction. At least one reinforcing layer (106c) may be optionally applied to the radially outermost belt strip (106b). In the particular embodiment shown in FIG. 1 and FIG. 2, two zero-degrees reinforcing layers (106c, 106d) are applied, these being commonly known as "0° belt", generally incorporating a plurality of reinforcing cords, typically textile cords, arranged at an angle of a few degrees with respect to a circumferential direction, and covered and welded together by means of an elastomeric material.

A sidewall (108), which extends, in an axially outer position, from the bead (103) to the end of the belt structure (106), is also applied externally to the carcass ply (101).

A tread (109), whose lateral edges are connected to the sidewalls (108), is applied circumferentially in a radially outer position with respect to the belt structure (106). Externally, the tread (109) has a rolling surface (109a) designed to come into contact with the ground. In this surface (109a), shown for simplicity as smooth in FIG. 1 and FIG. 2, there are generally made circumferential grooves which are connected by transverse notches (not shown in FIG. 1 and FIG. 2) so as to define a plurality of blocks of various shapes and sizes distributed over the rolling surface (109a).

In the connecting zone between the sidewalls (108) and the tread (109) there may optionally be present a strip of elastomeric material (110) commonly known as a "mini-sidewall", which is generally obtained by co-extrusion with the tread and enables the mechanical interaction between the tread (109) and the sidewalls (108) to be improved. Alternatively, the end portion of the sidewall (108) is made to directly cover the lateral edge of the tread (109). Between the belt structure (106) and the tread (109) there may optionally be present a underlayer which forms, together with the tread (109), a structure commonly known as a "cap and base" (not shown in FIG. 1 and FIG. 2).

In the case of tubeless tyres, a layer of elastomeric material (111), generally called a "liner", may also be provided in a radially inner position with respect to the carcass ply (101), to provide the necessary impermeability to the inflation air of the tyre. A layer of-sealing composition (107) which may be made according to the present invention may be placed in a radially inner position with respect to said layer of elastomeric material (111) (FIG. 1). A further layer of elastomeric material (113), generally called a "under-liner", may also be provided above the layer of elastomeric material (111), as an additional means of ensuring the impermeability of the tyre to an inflating fluid when the tyre is fitted on a rim and inflated: in this case a layer of sealing composition (107) which may be made according to the present invention may be placed between the layer of elastomeric material (111) and layer of elastomeric material (113), generally called a "under-liner".

Said layer of sealing composition (107) may, if desired, cover the entire inner surface of the tyre from one bead or rim area to the other: in this case the "liner" (111) may be omitted and the layer of sealing composition (107) may serve as a "liner".

The process for producing the tyre according to the present invention may be carried out according to technique and using apparatus that are known in the prior art, as described, for example, in the patents EP 199,064, U.S. Pat. No. 4,872,822 and U.S. Pat. No. 4,768,937, said process including at least one step of manufacturing the green tyre and at least one step of vulcanizing it.

More particularly, the process for producing the tyre comprises the steps of preparing beforehand and separately from each other a series of semi-finished articles corresponding to the different parts of the tyre (carcass plies, belt structure, bead wires, fillers, sidewalls and tread) which are subsequently associated with each other by means of suitable manufacturing machine generally comprising at least one building drum. Next, the subsequent step of vulcanization welds the aforesaid semi-finished articles together to produce a monolithic block, i.e. the finished tyre.

The step of preparing the aforesaid semi-finished articles is preceded by a step of preparing and moulding the corresponding mixtures which are the constituents of said semi-finished articles, according to conventional techniques.

The green tyre produced in this way is then sent for the subsequent steps of moulding and vulcanization. To this end, a vulcanization mould is used which is designed to receive the tyre being processed inside a moulding cavity having walls which are countermoulded and which define the outer surface of the tyre when the vulcanization is complete.

Alternative processes for the production of a tyre or of parts thereof without making use of semi-finished articles are described, for example, in the patent applications EP 928,680 and EP 928,702 cited above.

The moulding of the green tyre may be carried out by introducing a pressurized fluid into the space delimited by the inner surface of the tyre, so as to press the outer surface of the green tyre against the walls of the moulding cavity. In one of the most widespread moulding methods, a vulcanization chamber of elastomeric material filled with steam and/or another pressurized fluid is inflated inside the tyre which is enclosed in the moulding cavity. In this way, the green tyre is pushed against the inner walls of the moulding cavity, thus obtaining the desired moulding. Alternatively, the moulding may be carried out without an inflatable vulcanization chamber, by providing inside the tyre a metallic toroidal support shaped according to the configuration of the inner surface of the tyre to be produced, as described, for example, in the patent EP 242,840. The difference in the coefficient of thermal expansion between the metallic toroidal support and the green elastomeric material is exploited to provide an appropriate moulding pressure.

At this point, the step of vulcanizing the green elastomeric material present in the tyre is carried out. For this purpose, the outer wall of the vulcanization mould is brought into contact with a heating fluid (generally steam) in such a way that the outer wall reaches a maximum temperature generally in the range from 100° C. to 230° C. At the same time, the inner surface of the tyre is brought to the vulcanization temperature by using the pressurized fluid which is also used to press the tyre against the walls of the moulding cavity, heated to a maximum temperature in the range from 100° C. to, 250° C. The time required to obtain a satisfactory degree of vulcanization throughout the mass of the elastomeric material may generally vary from 3 to 90 minutes, and is mainly dependent on the dimensions of the tyre. When the vulcanization is complete, the tyre is removed from the vulcanization mould.

The present invention is further illustrated below by some examples of embodiment provided for guidance only and without restrictive intent.

EXAMPLES 1-4

The compositions given in Table 1 (the quantities of the various components have been expressed in phr) were prepared as follows.

All the components shown in Table 1 were loaded into a laboratory internal mixer of the type with tangential rotors (Banbury), model PL 1.6 made by Pomini, which was rotated at approximately 40 r.p.m. After approximately three minutes, but in any case as soon as the temperature reached 120° C., said compositions were discharged from the mixer and then transferred to a laboratory open mill mixer equipped with cylinders.

TABLE 1

| | EXAMPLE | | | |
|---|---|---|---|---|
| | 1 (*) | 2 (*) | 3 | 4 |
| IIR | 100 | — | 100 | — |
| NR | — | 100 | — | 100 |
| INDOPOL ® H100 | 5 | — | 40 | — |
| DPR 400 | — | 150 | — | 40 |
| N660 | 40 | 5 | 60 | 60 |
| Aromatic oil | 35 | 40 | 40 | 40 |
| Peroxide | 5 | — | — | — |
| Sulfur | — | 1.5 | — | — |

(*): comparative.
IIR: Isobutylene/isoprene copolymer having a Mooney viscosity ML (1 + 8) at 125° C. of 51 (Bayer Butyl ® 301, a commercial product made by Bayer);
NR: natural rubber; Standard Malaysian Rubber having a Mooney viscosity ML (1 + 4) at 100° C. of 64;
DPR 400: depolymerized natural rubber having a weight average molecular weight (Mw) of 90,000 and a Brookfield viscosity at 38° C. of between 300,000 cPs and 500,000 cPs (a commercial product made by Elementis Specialties);
INDOPOL ® H100: polybutene oil with a weight average molecular weight ($M_W$) of 1450 and a kinematic viscosity at 100° C. of between 168 cPs and 197 cPs (a commercial product made by BP Chemical);
Carbon black: N660 (Cabot);
Peroxide: Dicumyl peroxide (100% active peroxide; Perkadox BC-FF, a commercial product made by Akzo Nobel).

The Mooney viscosity ML(1+4) at 100° C. was measured, according to ISO standard 289/1, both on the compositions obtained as described above ($ML_{IN}$) and on the abovementioned compositions which were subjected to heating at a temperature of 200° C. for 10 min ($ML_{FIN}$). The results obtained are given in Table 2.

The abovementioned compositions were also subjected to flowability characterization using a Goettfer Rheovulkameter 78.90, Version 4.00. For this purpose, cylindrical test specimens with weights in the range of from 4.5 g to 5.5 g were obtained by punching both from the compositions obtained as disclosed above (Initial) and from the abovementioned compositions which were subjected to heating at a temperature of 200° C. for 10 min (Final). Said test specimens were pushed by means of a piston in a capillary having 2 mm internal diameter, operating at a temperature of 100° C. and at a predetermined pressure (the values of pressure are given in Table 2), and the amount of flowing material was measured ($cm^3/s$). The obtained results are given in Table 2.

TABLE 2

| | EXAMPLE | | | |
|---|---|---|---|---|
| | 1 (*) | 2 (*) | 3 | 4 |
| | Mooney viscosity | | | |
| $M_{IN}$ | 28 | 10 | 16 | 19 |
| $M_{FIN}$ | 10 | 16 | 18 | 18 |
| | Flowability characterization | | | |
| | Initial | | | |
| 80 bar | 406 ($cm^3/s$) | n.d. | 310 ($cm^3/s$) | 292 ($cm^3/s$) |
| 40 bar | 152 ($cm^3/s$) | n.d. | 57 ($cm^3/s$) | 54 ($cm^3/s$) |
| 30 bar | 64 ($cm^3/s$) | n.d. | 19 ($cm^3/s$) | 17 ($cm^3/s$) |
| 20 bar | 15 ($cm^3/s$) | n.d. | 5 ($cm^3/s$) | 4 ($cm^3/s$) |
| | Final | | | |
| 80 bar | n.d. | 423 ($cm^3/s$) | 301 ($cm^3/s$) | 289 ($cm^3/s$) |
| 40 bar | n.d. | 162 ($cm^3/s$) | 53 ($cm^3/s$) | 49 ($cm^3/s$) |
| 30 bar | n.d. | 59.6 ($cm^3/s$) | 16 ($cm^3/s$) | 14 ($cm^3/s$) |
| 20 bar | n.d. | 14 ($cm^3/s$) | 3.5 ($cm^3/s$) | 3 ($cm^3/s$) |

(*): comparative,
n.d.: not detectable as the material flow to quickly.

The results given in Table 2, show that the compositions according to the present invention (Example 3 and 4) maintain substantially unchanged both the Mooney viscosity values and the flowability values before and after the heating treatment (200° C., for 10 min). On the contrary, the composition of Example 1 which comprises peroxide and the composition of Example 2 which comprises sulfur, show considerable changes both in the Mooney viscosity values and in the flowability values before and after said heating treatment.

EXAMPLE 5

The compositions of Examples 3 was used to prepare the layer of sealing composition for Pirelli P6000® 195/60R15 tyres. The tyre made in this way was punctured with a 4 mm nail at four points located at 90° to each other around the tyre. After extraction of the nail, no air flowed out of the tyre.

The invention claimed is:
1. A tyre for a vehicle wheel, comprising:
a carcass structure;

a belt structure applied in a circumferentially outer position with respect to the carcass structure;

a tread circumferentially superimposed on the belt structure;

a pair of sidewalls applied laterally on opposite sides with respect to the carcass structure; and at least one layer of sealing composition placed in a radially inner position with respect to the tread;

wherein the carcass structure comprises at least one carcass ply shaped in a substantially toroidal configuration, wherein opposite lateral edges of the carcass structure are associated with respective bead wires, wherein the belt structure comprises at least one belt strip, wherein the sealing composition comprises:
  at least one high molecular weight amorphous polymer;
  at least one low molecular weight amorphous polymer; and
  at least one reinforcing filler;

wherein the sealing composition is substantially non-crosslinked, and wherein the sealing composition has a flowability value, measured at a temperature of 100° C. and at a pressure of 30 bar, not higher than 30 cm³/s.

2. The tyre of claim 1, wherein the sealing composition comprises at least one plasticizer.

3. The tyre of claim 1, wherein a ratio of the flowability value of the sealing composition measured at a temperature of 100° C. and at a pressure of 30 bar to the flowability value of the sealing composition heated at a temperature of 200° C. for 10 min, measured at a temperature of 100° C. and at a pressure of 30 bar, is comprised between 0.7:1 and 1.3:1.

4. The tyre of claim 1, wherein a ratio of the flowability value of the sealing composition measured at a temperature of 100° C. and at a pressure of 30 bar to the flowability value of the sealing composition heated at a temperature of 200° C. for 10 min, measured at a temperature of 100° C. and at a pressure of 30 bar, is comprised between 0.8:1 and 1.2:1.

5. The tyre of claim 1, wherein the at least one layer of sealing composition is disposed in a radially inner position with respect to the carcass structure.

6. The tyre of claim 1, wherein the at least one layer of sealing composition is disposed between the carcass structure and a layer of elastomeric material placed in a radially inner position with respect to the carcass structure.

7. The tyre of claim 6, wherein a further layer of elastomeric material is disposed between the at least one layer of sealing composition and the carcass structure.

8. The tyre of claim 1, wherein the at least one layer of sealing composition extends over a surface substantially corresponding to a surface of development of the tread.

9. The tyre of claim 1, wherein the at least one layer of sealing composition has a thickness in a range of from 0.5 mm to 6.0 mm.

10. The tyre of claim 1, wherein the sealing composition comprises:
  100 phr of the at least one high molecular weight amorphous polymer;
  from 25 phr to 75 phr of at least one low molecular weight amorphous polymer;
  from 50 phr to 150 phr of the at least one reinforcing filler; and
  from 0 phr to 100 phr of the at least one plasticizer.

11. The tyre of claim 1, wherein the at least one high molecular weight amorphous polymer has a glass transition temperature ($T_g$) below 20° C.

12. The tyre of claim 11, wherein the at least one high molecular weight amorphous polymer comprises one or more of cis-1,4-polyisoprene (either natural or synthetic rubber), epoxidized natural rubber (ENR), 3,4-polyisoprene, polychloroprene, polybutadiene, optionally halogenated isoprene/isobutene copolymers, 1,3-butadiene/acrylonitrile copolymers, styrene/1,3-butadiene copolymers, styrene/isoprene copolymers, and styrene/isoprene/1,3-butadiene copolymers.

13. The tyre of claim 11, wherein the at least one high molecular weight amorphous polymer is natural rubber.

14. The tyre of claim 1, wherein the at least one high molecular weight amorphous polymer is selected from copolymers of ethylene with at least one ester containing an ethylenic unsaturation.

15. The tyre of claim 14, wherein the at least one high molecular weight amorphous polymer is selected from:
  ethylene/vinyl acetate (EVA);
  ethylene/ethyl acrylate (EEA); and
  ethylene/butyl acrylate (EBA).

16. The tyre of claim 1, wherein the at least one high molecular weight amorphous polymer is selected from elastomeric polymers of one or more monoolefins with an olefinic comonomer or derivatives thereof.

17. The tyre of claim 16, wherein the at least one high molecular weight amorphous polymer comprises one or more of ethylene/propylene copolymers (EPR), ethylene/propylene/diene copolymers (EPDM), polyisobutene, butyl rubbers, and halobutyl rubbers.

18. The tyre of claim 16, wherein the at least one high molecular weight amorphous polymer is selected from butyl rubbers.

19. The tyre of claim 1, wherein the at least one high molecular weight amorphous polymer has a weight average molecular weight ($M_w$) greater than 150,000.

20. The tyre of claim 1, wherein the at least one high molecular weight amorphous polymer has a weight average molecular weight ($M_w$) greater than 200,000.

21. The tyre of claim 1, wherein the at least one high molecular weight amorphous polymer has a viscosity within a range of from 20 to 160.

22. The tyre of claim 1, wherein the at least one low molecular weight amorphous polymer has a weight average molecular weight ($M_w$) less than 150,000.

23. The tyre of claim 22, wherein the at least one low molecular weight amorphous polymer is selected from:
  liquid cis-polyisoprene (either heat depolymerized natural rubber or synthetic cis-polyisoprene polymerized to low molecular weight);
  liquid polybutadiene;
  liquid polybutene;
  liquid ethylene/propylene/diene copolymers (EPDM); and
  liquid butyl rubber.

24. The tyre of claim 22, wherein the at least one low molecular weight amorphous polymer is selected from:
  heat depolymerized natural rubber; and
  liquid polybutene.

25. The tyre of claim 1, wherein the at least one low molecular weight amorphous polymer has a weight average molecular weight ($M_w$) within a range of from 500 to 100,000.

26. The tyre of claim 1, wherein the at least one low molecular weight amorphous polymer is selected from a liquid rubber type having a maximum viscosity of 2 million cPs.

27. The tyre of claim 26, wherein the at least one low molecular weight amorphous polymer is selected from:
  liquid cis-polyisoprene (either heat depolymerized natural rubber or synthetic cis-polyisoprene polymerized to low molecular weight);

liquid polybutadiene;
liquid polybutene;
liquid ethylene/propylene/diene copolymers (EPDM); and
liquid butyl rubber.

28. The tyre of claim 26, wherein the at least one low molecular weight amorphous polymer is selected from:
heat depolymerized natural rubber; and
liquid polybutene.

29. The tyre of claim 1, wherein the at least one low molecular weight amorphous polymer is selected from a liquid rubber type having a viscosity within a range of from 100 cPs to 1 million cPs.

30. The tyre of claim 1, wherein the at least one reinforcing filler comprises one or more of carbon black, silica, alumina, aluminosilicates, calcium carbonate, and kaolin.

31. The tyre of claim 1, wherein the at least one reinforcing filler is carbon black.

32. The tyre of claim 2, wherein the at least one plasticizer comprises one or more of mineral oils, vegetable oils, and synthetic oils.

33. The tyre of claim 2, wherein the at least one plasticizer comprises one or more of aromatic oil, naphthenic oil, phthalates, and soya oil.

34. A process for producing a tyre for a vehicle wheel, comprising:
manufacturing the tyre;
moulding the tyre in a mould cavity formed in a vulcanization mould;
subjecting the tyre to crosslinking by heating the tyre to a predetermined temperature and for a predetermined period; and
providing the tyre with at least one layer of sealing composition;
wherein manufacturing the tyre comprises assembling on a toroidal support:
at least one carcass ply;
a belt structure in a circumferentially outer position with respect to the at least one carcass ply; and
a tread in a circumferentially outer position with respect to the belt structure;
wherein the sealing composition comprises:
at least one high molecular weight amorphous polymer;
at least one low molecular weight amorphous polymer; and
at least one reinforcing filler;
wherein the sealing composition is substantially non-crosslinked, and
wherein the sealing composition has a flowability value, measured at a temperature of 100° C. and at a pressure of 30 bar, not higher than 30 cm³/s.

35. The process of claim 34, wherein providing the tyre with at least one layer of sealing composition comprises applying the sealing composition onto an inner surface of a finished tyre.

36. The process of claim 34, wherein providing the tyre with at least one layer of sealing composition is carried out during manufacturing the tyre.

37. The process of claim 34, wherein subjecting the tyre to crosslinking comprises heating the tyre to a temperature in a range from 100° C. to 250° C.

38. The process of claim 34, wherein the at least one high molecular weight amorphous polymer has a glass transition temperature ($T_g$) below 20° C.

39. The process of claim 38, wherein the at least one high molecular weight amorphous polymer comprises one or more of cis-1,4-polyisoprene (either natural or synthetic rubber), epoxidized natural rubber (ENR), 3,4-polyisoprene, polychloroprene, polybutadiene, optionally halogenated isoprene/isobutene copolymers, 1,3-butadiene/acrylonitrile copolymers, styrene/1,3-butadiene copolymers, styrene/isoprene copolymers, and styrene/isoprene/1,3-butadiene copolymers.

40. The process of claim 38, wherein the at least one high molecular weight amorphous polymer is natural rubber.

41. The process of claim 34, wherein the at least one high molecular weight amorphous polymer is selected from copolymers of ethylene with at least one ester containing an ethylenic unsaturation.

42. The process of claim 41, wherein the at least one high molecular weight amorphous polymer is selected from:
ethylene/vinyl acetate (EVA);
ethylene/ethyl acrylate (EEA); and
ethylene/butyl acrylate (EBA).

43. The process of claim 34, wherein the at least one high molecular weight amorphous polymer is selected from elastomeric polymers of one or more monoolefins with an olefinic comonomer or derivatives thereof.

44. The process of claim 43, wherein the at least one high molecular weight amorphous polymer comprises one or more of ethylene/propylene copolymers (EPR), ethylene/propylene/diene copolymers (EPDM), polyisobutene, butyl rubbers, and halobutyl rubbers.

45. The process of claim 43, wherein the at least one high molecular weight amorphous polymer is selected from butyl rubbers.

46. The process of claim 34, wherein the at least one high molecular weight amorphous polymer has a weight average molecular weight ($M_w$) greater than 150,000.

47. The process of claim 34, wherein the at least one high molecular weight amorphous polymer has a weight average molecular weight ($M_w$) greater than 200,000.

48. The process of claim 34, wherein the at least one high molecular weight amorphous polymer has a viscosity within a range of from 20 to 160.

49. The process of claim 34, wherein the at least one low molecular weight amorphous polymer has a weight average molecular weight ($M_w$) less than 150,000.

50. The process of claim 49, wherein the at least one low molecular weight amorphous polymer is selected from:
liquid cis-polyisoprene (either heat depolymerized natural rubber or synthetic cis-polyisoprene polymerized to low molecular weight);
liquid polybutadiene;
liquid polybutene;
liquid ethylene/propylene/diene copolymers (EPDM); and
liquid butyl rubber.

51. The process of claim 49, wherein the at least one low molecular weight amorphous polymer is selected from:
heat depolymerized natural rubber; and
liquid polybutene.

52. The process of claim 34, wherein the at least one low molecular weight amorphous polymer has a weight average molecular weight ($M_w$) within a range of from 500 to 100,000.

53. The process of claim 34, wherein the at least one low molecular weight amorphous polymer is selected from a liquid rubber type having a maximum viscosity of 2 million cPs.

54. The process of claim 53, wherein the at least one low molecular weight amorphous polymer is selected from:
liquid cis-polyisoprene (either heat depolymerized natural rubber or synthetic cis-polyisoprene polymerized to low molecular weight);
liquid polybutadiene;
liquid polybutene;

liquid ethylene/propylene/diene copolymers (EPDM); and
liquid butyl rubber.

55. The process of claim 53, wherein the at least one low molecular weight amorphous polymer is selected from:
heat depolymerized natural rubber; and
liquid polybutene.

56. The process of claim 34, wherein the at least one low molecular weight amorphous polymer is selected from a liquid rubber type having a viscosity within a range of from 100 cPs to 1 million cPs.

57. The process of claim 34, wherein the at least one reinforcing filler comprises one or more of carbon black, silica, alumina, aluminosilicates, calcium carbonate, and kaolin.

58. The process of claim 34, wherein the at least one reinforcing filler is carbon black.

59. The process of claim 34, wherein the sealing composition comprises at least one plasticizer.

60. The process of claim 59, wherein the at least one plasticizer comprises one or more of mineral oils, vegetable oils, and synthetic oils.

61. The process of claim 59, wherein the at least one plasticizer comprises one or more of aromatic oil, naphthenic oil, phthalates, and soya oil.

* * * * *